United States Patent [19]

Wetzel

[11] Patent Number: 4,497,481
[45] Date of Patent: Feb. 5, 1985

[54] ARRANGEMENT FOR SUPPLYING ORIGINALS FOR COPYING APPARATUS

[75] Inventor: Guenter Wetzel, Haar, Fed. Rep. of Germany

[73] Assignee: Agfa-Gevaert AG, Leverkusen, Fed. Rep. of Germany

[21] Appl. No.: 424,962

[22] Filed: Sep. 27, 1982

[30] Foreign Application Priority Data

Dec. 18, 1981 [DE] Fed. Rep. of Germany ....... 3150223
Dec. 18, 1981 [DE] Fed. Rep. of Germany ....... 3150224

[51] Int. Cl.³ ............................................. B65H 3/08
[52] U.S. Cl. .................................... 271/3.1; 271/100; 271/106; 271/108
[58] Field of Search .................. 271/3.1, 99, 100, 102, 271/103, 106, 108

[56] References Cited

U.S. PATENT DOCUMENTS

| | | | |
|---|---|---|---|
| 3,632,105 | 1/1972 | Verhoeven | 271/301 |
| 4,056,263 | 11/1977 | La White | 271/301 X |
| 4,070,015 | 1/1978 | Muka | 271/100 |
| 4,269,405 | 5/1981 | Mitzel | 271/99 X |
| 4,350,329 | 9/1982 | Holzhauser | 271/301 X |

*Primary Examiner*—Richard A. Schacher
*Attorney, Agent, or Firm*—Michael J. Striker

[57] ABSTRACT

An arrangement for supplying originals for a copying apparatus has a supply stack arranged above an illumination location of a copying apparatus, guiding members forming a transport path for guiding the original from the stack to the illumination location, a transporting device arranged to turn the original removed from the stack and supply the original to the illumination location, wherein the transporting device includes a rotatable transport cylinder connected with the transport path and having a peripheral portion with a turnable suction nozzle member with a plurality of suction nozzles forming the separating device, the stack has a stack-supporting surface with an end section forming a tangent with the periphery of the transport cylinder and having an opening extending from a contact point with the cylinder and to a front stack abutment, and a control device is provided and arranged to switch off the transport cylinder in a position in which the suction nozzle member is located in the region of the opening of the stack-supporting surface, to turn the suction nozzle member to the lower side of the stack, to activate a valve communicating the suction nozzles with a suction conduit of a suction source, to again switch on the transport cylinder, and to turn back the suction nozzle member on the periphery of the transport cylinder.

8 Claims, 7 Drawing Figures

ARRANGEMENT FOR SUPPLYING ORIGINALS FOR COPYING APPARATUS

BACKGROUND OF THE INVENTION

The present invention relates to an arrangement for supplying originals for a copying apparatus.

Arrangements of the above mentioned general type are known in the art. Known arrangements have a supply stack for originals arranged above an illumination location of the copying apparatus, a separating device for taking the originals placed in the stack with their side to be illuminated upwardly, from the lower side of the supply stack, and a transporting device which turns the original taken from the stack and supplies it with its side to be illuminated downwardly to the illumination location of the copying apparatus. One such arrangement is disclosed, for example, in German Offenlegungsschrift No. 2,908,398. The separation of the original is performed with the aid of pulling rollers which are associated with braking rollers and supply the originals to a cylindrical guide serving for deflecting the originals. Such a separating device is not suitable to separate with sufficient reliability with respect to the paper quality and maintenance condition of very different originals which are conventionally supplied in a copying apparatus. Moreover, a relatively great friction force acts during deflecting of the originals on the cylindrical guide.

It is known to more reliably perform the separation of sheet-shaped objects of different properties so that the sheet-shaped shaped objects are engaged by a nozzle strip or member connected with a suction device. This arrangement is disclosed, for example, in U.S. Pat. No. 3,934,864. The above mentioned arrangement is, however, relatively expensive and is not such as to simultaneously carry out turning of the originals.

SUMMARY OF THE INVENTION

Accordingly, it is an object of the present invention to provide an arrangement for applying originals in a copying apparatus, which avoids the disadvantages of the prior art.

More particularly, it is an object of the present invention to provide an arrangement for supplying originals in a copying apparatus, in which originals of different properties are reliably separated, turned in a simple manner, supplied to an illuminating location, and selectively illuminated one or several times.

In keeping with these objects and with others which will become apparent hereinafter, one feature of the present invention resides, briefly stated, in an arrangement for supplying originals for a copying apparatus, having a supply stack, separating means arranged to remove an original from a lower side of the supply stack, guiding means forming a transport path for guiding the original from the stack to the illumination location, and transporting means arranged to turn the original removed from the stack and supply the original to the illumination location, wherein the transporting means includes a rotatable transport cylinder connected with the transport path, the transport cylinder has a peripheral portion provided with a turnable suction nozzle member having a plurality of suction nozzles, a stack-supporting surface of the stack has near the transport cylinder an end section forming a tangent with the periphery of the transport cylinder and provided with an opening extending from a contact point of the supporting surface with the cylinder to a front abutment of the stack and allowing turning of the suction nozzle member to a free lower side of the stack in the region of the opening, and control means is provided to switch off the transporting cylinder in a position in which the suction nozzle member is located in the region of the opening of the stack-supporting surface, to turn the suction nozzle member to the lower side of the stack, to actuate a valve for communicating the suction nozzles of the suction nozzle member with a suction conduit, to again switch on the transporting cylinder, and to turn back the suction nozzle member on the periphery of the transport cylinder.

When the arrangement for supplying originals in a copying apparatus is designed in accordance with the present invention, it eliminates the above mentioned disadvantages and provides for the above mentioned highly advantageous results.

The novel features which are considered characteristic for the invention are set forth in particular in the appended claims. The invention itself, however, both as to its construction and its method of operation, together with additional objects and advantages thereof, will be best understood from the following description of specific embodiments when read in conjunction with the accompanying drawing.

DESCRIPTION OF THE PREFERRED EMBODIMENTS

Figure 1:
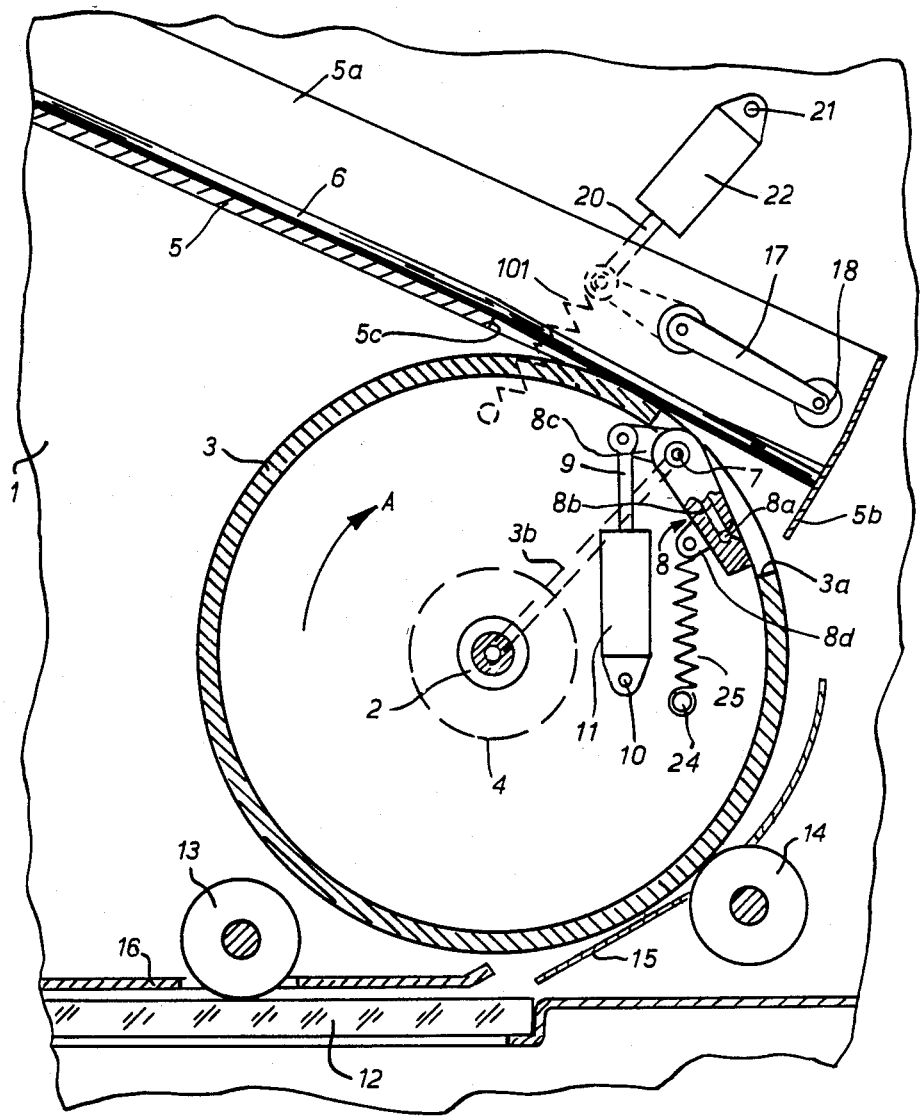
FIG. 1 is a view showing an arrangement for supplying originals in a copying apparatus in accordance with the present invention.

An original supply device for a copying apparatus in accordance with the present invention has a shaft 2 which is supported in a frame 1 of the apparatus. When the apparatus is turned on, the shaft 2 is continuously driven by a not shown drive motor. A transport cylinder 3 is supported on the shaft 2. The transport cylinder 3 can be coupled with a magnetic coupling 4 with the shaft 2.

A stack-supporting surface 5 for an original stack 6 is arranged above the transport cylinder 3. The supporting surface 5 is limited by lateral walls 5a and a front stack abutment 5b. The supporting surface 5 extends at its cylinder-side end substantially tangentially to the outer surface of the transport cylinder 3. It has in this region an opening 5c which extends to the front stack abutment 5b. At this location the not supported stack somewhat bends, so that the lowest sheet is supported on the outer surface of the transport cylinder 3.

A turnable suction nozzle member 8 is arranged in an opening 3a in the periphery of the transport cylinder 3 on a shaft 7. A row of suction nozzles 8a is arranged on the upper side of the member 8. The suction nozzles 8a are connected via passages 8b with a central opening of the shaft 7, which in turn is connected via a passage 3b of the transport cylinder 3 with an annular groove of the shaft 2. The annular groove communicates with an opening provided at a suitable location with a central opening of the shaft 2. The central opening extends in a known manner to the shaft end when its opens in a not shown conventional central coupling for a vacuum conduit 63 shown in FIG. 4. The vacuum conduit 63 connects the suction nozzles with a vacuum pump or a respective supply container.

For turning the suction nozzle member 8, it carries an arm 8c. A pulling rod 9 of a pulling magnet 11 supported on a pin 10 of the transport cylinder 3 is pivotally connected with the arm 8c.

A transparent supporting plate 12 is arranged under the transport cylinder 3. Originals pulled from the stack 6 are placed on the transparent supporting plate 12 during its illumination. For supplying the originals over the transparent supporting plate 12, a supply roller 13 is provided which is driven in a known manner. The supply roller 13 slides on the supporting plate 12 as long as no originals to be supplied are located on the supporting plate 12. A pressing and supplying roller 14 lies on the periphery of the transport cylinder 3. It engages the originals pulled from the stack 6 before they leave the transport cylinder 3 and are supplied to the transparent supporting plate 12. For reliable guidance of the originals in this region, guiding sheets 15 and 16 are provided here.

Finally, a turnable holding-down member 17 is arranged above the cylinder-side end of the stack. The member 17 carries a pressing roller 18 which can be pressed on the front end of the stack so as to press the originals in suitable moment on the suction nozzle member 8 and to compensate for eventual unevenness of the originals, which can affect their unobjectionable placement on the suction nozzles 8a. Turning of the member 17 is performed by a turning lever 19 supported on its end, and a pulling magnet 22 turnably supported on a pin 21 and having a pulling rod 20 pivotally connected with the turning lever 19. The return of the member 17 is performed by a return spring 101 which is also pivotally connected with the turning lever 19.

Figure 4:
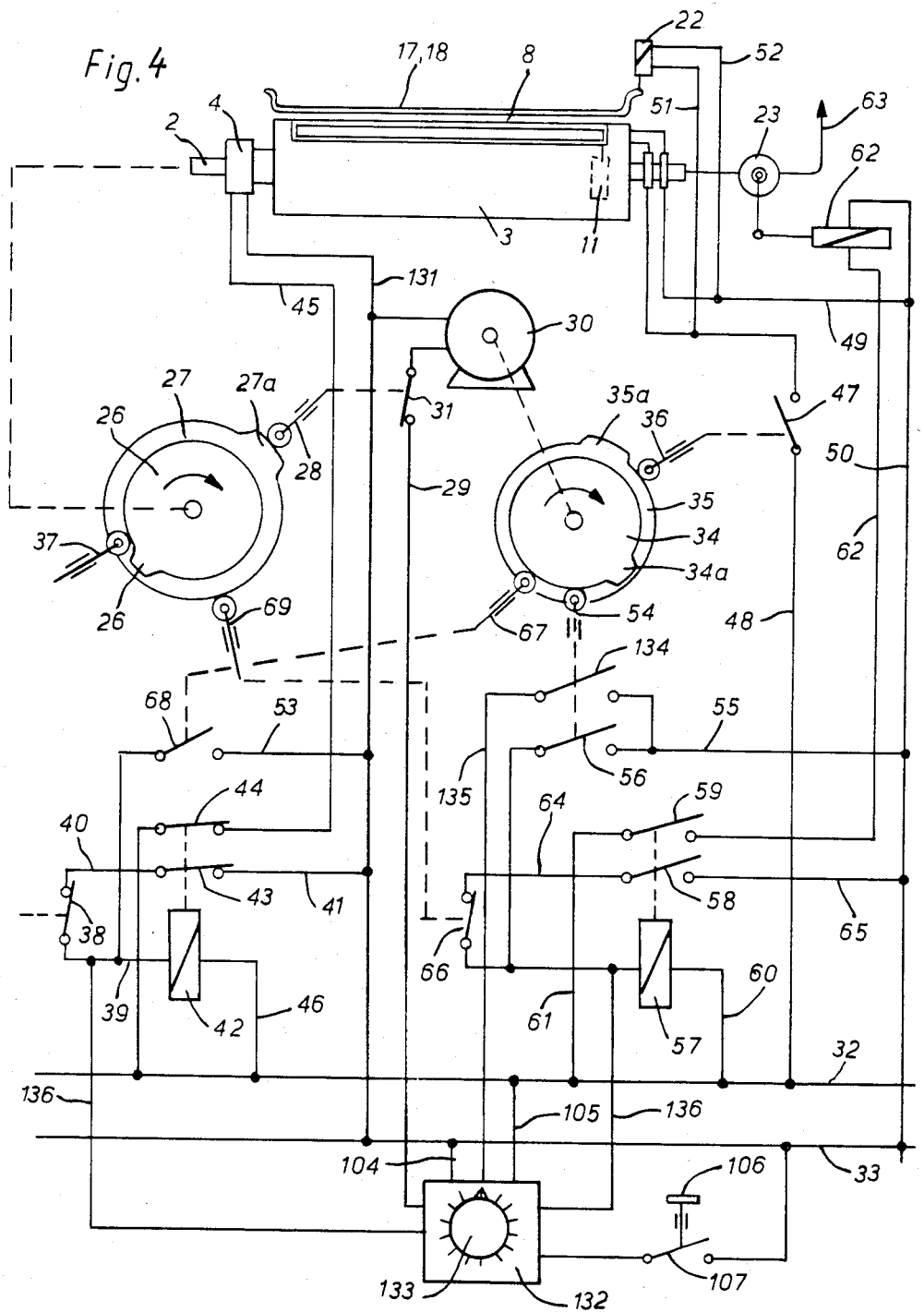
FIG. 4 is a circuit for operating a control device of the inventive arrangement.

The operation of the above described arrangement is performed in the following manner:

In the initial position of the transport cylinder 3 the suction nozzle member 8 is located in the position shown in FIG. 1 under the opening 5c of the stack-supporting surface 5. In the beginning of the feeding or transporting step, it is turned as shown in FIG. 1 with the aid of the pulling magnet 11 to the lowest sheet of the stack 6, the suction nozzles 8a are actuated, and the pressing roller 18 is turned by actuation of the pulling magnet 22 onto the stack. The actuation of the suction nozzles 8a is performed by actuation of a valve 23 which is shown in FIG. 4.

After this, the pulling magnets 11 and 22 are turned off, whereby the suction nozzle member 8 is turned back under the action of the pulling spring 25, and the holding-down member 17, 18 is turned back under the action of the pulling spring 101 from the stack. The frontmost edge of the original to be separated is bent off from the stack 6, whereby a very reliable separation of the original from the remainder of the stack is attained.

Figure 3:
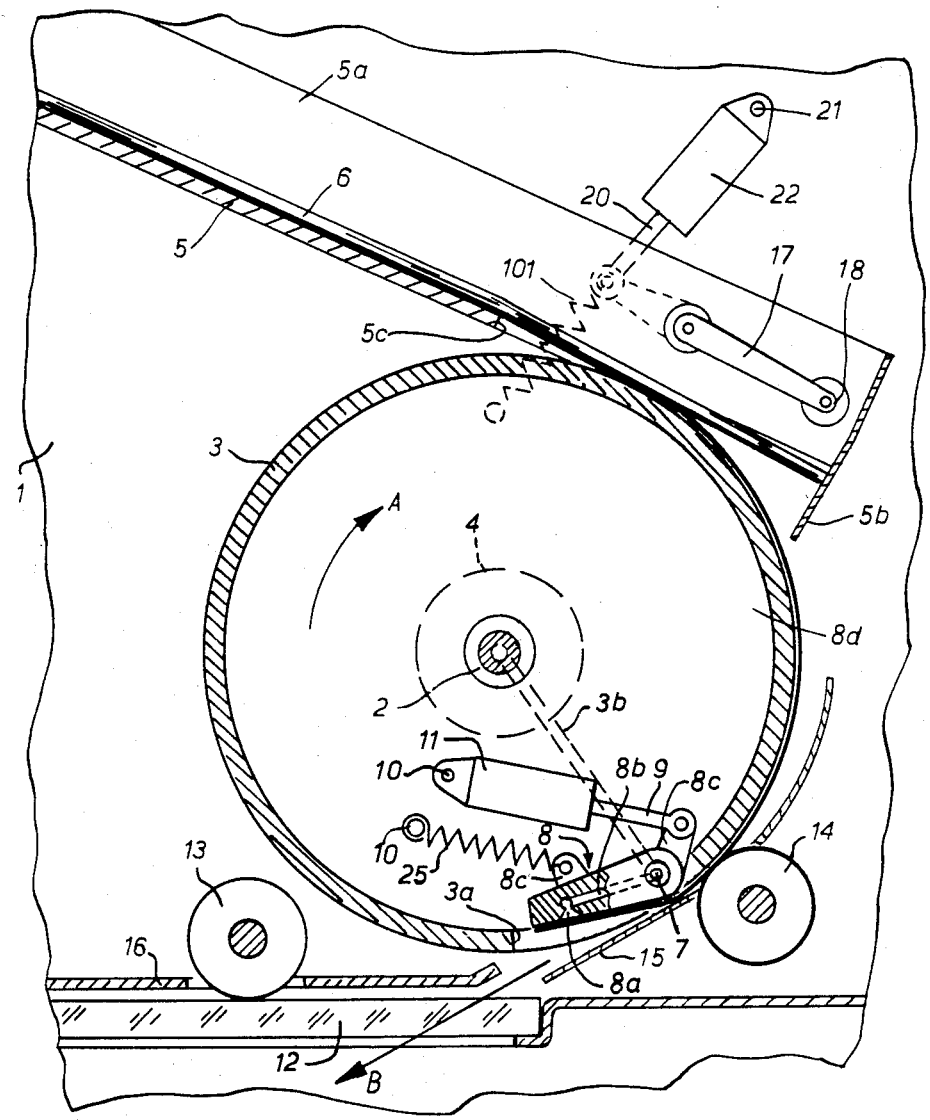
FIG. 3 is a view substantially corresponding to the views of FIGS. 1 and 2 but showing the inventive arrangement in a further operational position.

Now the transport cylinder 3 is driven in rotation in the direction of the arrow A, whereby the separated original is pulled from the stack by the suction nozzle member and supplied to the feed roller 14. As soon as the transport cylinder 3 assumes its position shown in FIG. 3, the suction air is turned off. The front end of the original engaged by the suction nozzle member 8 springs back from the transport cylinder and lies on the outer guide 15, so that during further rotation of the transport cylinder 3 in direction of the arrow B it runs under the guide 16 and can arrive under the further feed roller 13.

From the feed roller 13, the original is transported in a known manner first over the transparent supporting plate 12 and is fixed there for illumination by an illuminating arrangement which is not shown in the drawing but is located under the transparent supporting plate 12. After this, the original is expelled from the copying apparatus or placed again from above onto the stack 6 for a repeated illumination.

The control of the above described separating and transporting steps is performed with a control device shown in FIG. 4.

Cam disks 26 and 27 are drivingly connected with the shaft of the transport cylinder 3 and rotate in direction of the arrow C. The cam disk 27 has a cam 27a which cooperates with a pusher 28. The pusher 28 actuates a switch 31 which is located in a supply conduit 29 of a drive motor 30. The drive motor 30 drives further cam disks 24 and 25 in direction of the arrow D. In the shown position of the cam disk 27 or the switch 31, the drive motor 30 is switched on, as long as a relay contained in a control unit 103 is operative. The supply conduit 29 of the drive motor 30 is connected then via a supply conduit 105 of the control unit 103 with a network conductor 32. The connection of a further network conductor 33 with the control unit and with the drive motor 30 is performed via conductors 104 and 131. The relay provided in the control unit 103 is so connected that its holding circuit is located in a current circuit of the motor 30, so that after each switching off of the motor 30 it deenergizes and must be again switched on by pressing a starting button 106 acting upon a starting switch 107.

During further rotation of the cam disks 26 and 27, or 34 and 35, the cam 26a of the cam disk 26 reaches first a pusher 37 which cooperates with this cam and controls a switch 38. The switch 38 lies in a holding circuit 39–41 of a relay 42 which is closed in this operational phase via a holding contact 43 of the relay 42. A working contact 44 of the relay 42 connects via conductors 131 and 45 the magnetic coupling 4 with the network conductors 32 and 33, whereby the transport cylinder 3 is coupled with the shaft 2. The return flow of the current from the relay 42 to the network conductor 32 is performed via a conductor 46.

As soon as the cam 26a lifts the pusher 37, the holding circuit of the relay 42 is interrupted via the switch 38. The relay 42 is deenergized, whereby the coupling 4 is switched off, and the transport cylinder 3 as well as the drivingly connected therewith cam disks 26 and 26 comes to a stop in the position corresponding to the position shown in FIG. 1. The cam 27a of the cam disk 27 is arranged so that in this position the cam disk 27 retains the pusher 28 lifted, so that the motor 30 or the cam disks 34 and 35 run further.

Figure 2:
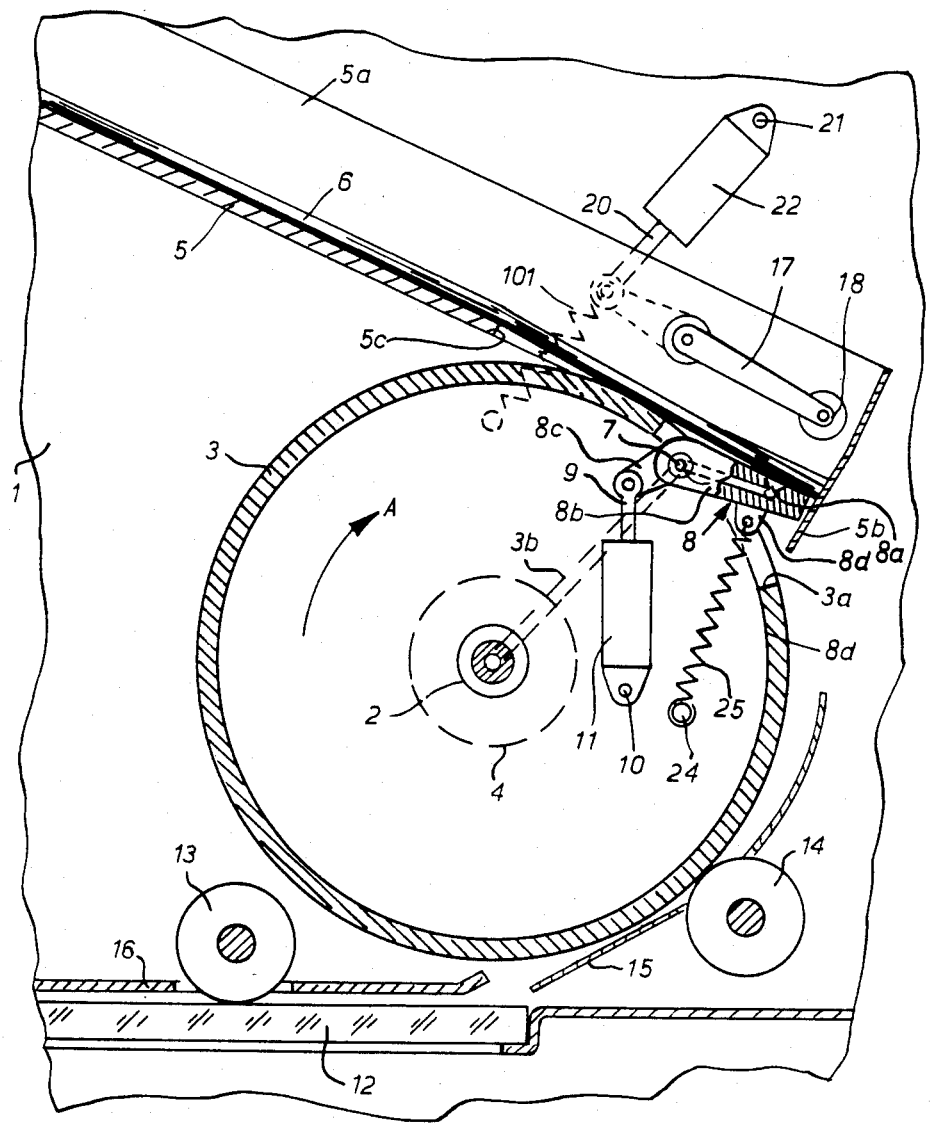
FIG. 2 is a view substantially corresponding to the view of FIG. 1 but showing the inventive arrangement in another operational position.

During a further rotation of the cam disks 34 and 35 in the direction of the arrow D, the cam 35a of the cam disk 35 lifts the pusher 36. It actuates a switch 47 which lies in a conductor 48 located within the network conductor 43. The conductor 48, and also a further conductor 49, is connected via sliding contacts with the magnets 11 arranged in the interior of the transport cylinder 3. The return flow of the current to the network conductor 32 is performed via a conductor 50. With the closed switch 47, the pulling magnet 11 is energized and the suction nozzle member 8 is turned to the position shown in FIG. 2 towards the lower side of the stack 6. Simultaneously, the pulling magnet 22, which turns the holding-down member 17, 18 to the stack, is switched on via conductors 51 and 52. Naturally, the first mentioned pulling magnet 22 if necessary can be controlled via its own cam disk or via its own switch in a switching time deviating from the switching time of the pulling magnet 11.

Shortly after lifting the pusher 36 by the cam 35a of the cam disk 35, the cam 34a of the cam disk 34 reaches a pusher 56 cooperating therewith. It switches on via a switch 56 lying in a conductor 55 a relay 57. The relay 57 actuates a working contact 58 and a holding contact 59. The relay 57 is connected when the switch 56 is closed via the conductors 55 and 59, on the one hand, and via conductor 60, on the other hand, with the network conductors 32 and 33.

The working contact 59 connects via conductors 61 and 62 as well as the conductor 50 a pulling manget 62 with the network conductors 32 and 33, whereby the valve 23 opens a suction conduit 63 and this suction conduit is connected with a not shown suction air stream of the copying apparatus. The suction conduit 63 is connected in a known manner via a central coupling in the shaft 2 of the transport cylinder 3, with the suction nozzle member 8. The switch 58 actuated by the relay 57 and lying in the holding circuit 59, 60, 64 and 65 of the relay 57 prevents the relay 57 from deenergizing, so that the suction nozzle member 8 remains connected with the suction air until an interrupting switch 66 located in this holding circuit is opened.

Shortly after actuation of the pusher 54 acting for switching on of the suction nozzle member 8 under the action of the cam 34a, the cam 34a reaches a pusher 67 which is connected with a switch 68 lying in the conductor 53 of the relay 54. Thereby the relay 54 is switched on, and the transport cylinder 3 is again coupled with the continuously rotating shaft 2. Thereby the cam disks 27 and 28 start running again in direction of the arrow C. The cam 27a, which stands by this time point under the pusher 28 and thereby holds the motor 30 in running condition, rotates away under the pusher 28 so that the motor 30 comes to a stop. This must be first attained when the cam 34a of the cam disk 34 releases the pusher 67 or the switch contact 68 connected therewith, inasmuch as otherwise the transport cylinder 3 during the next revolution cannot be brought to a stop by the cam 26a of the cam disk 26 or the interrupting switch 38.

The transport cylinder 3 continues now its rotation in direction of the arrow A so long as the relay 42 is prevented from deenergizing by its holding circuit. The transport cylinder 3 arrives at the position shown in FIG. 3, in which it takes along a front edge of the original separated from the stack 6, the front edge being sucked by the suction nozzle member 8. In this position the cam 27a of the cam disk 27 reaches a pusher 69 which opens the switch 66 lying in the holding circuit of the relay 67. The relay 57 deenergizes and the suction air valve 23 is closed. Thereby the transported original leaves in the above described manner the transport cylinder 3 and is transferred to the transporting rollers 13 and 14. The transport cylinder 3 continues its rotation in the direction of the arrow A until it arrives at the initial position shown in FIGS. 1 and 4.

Figure 5:
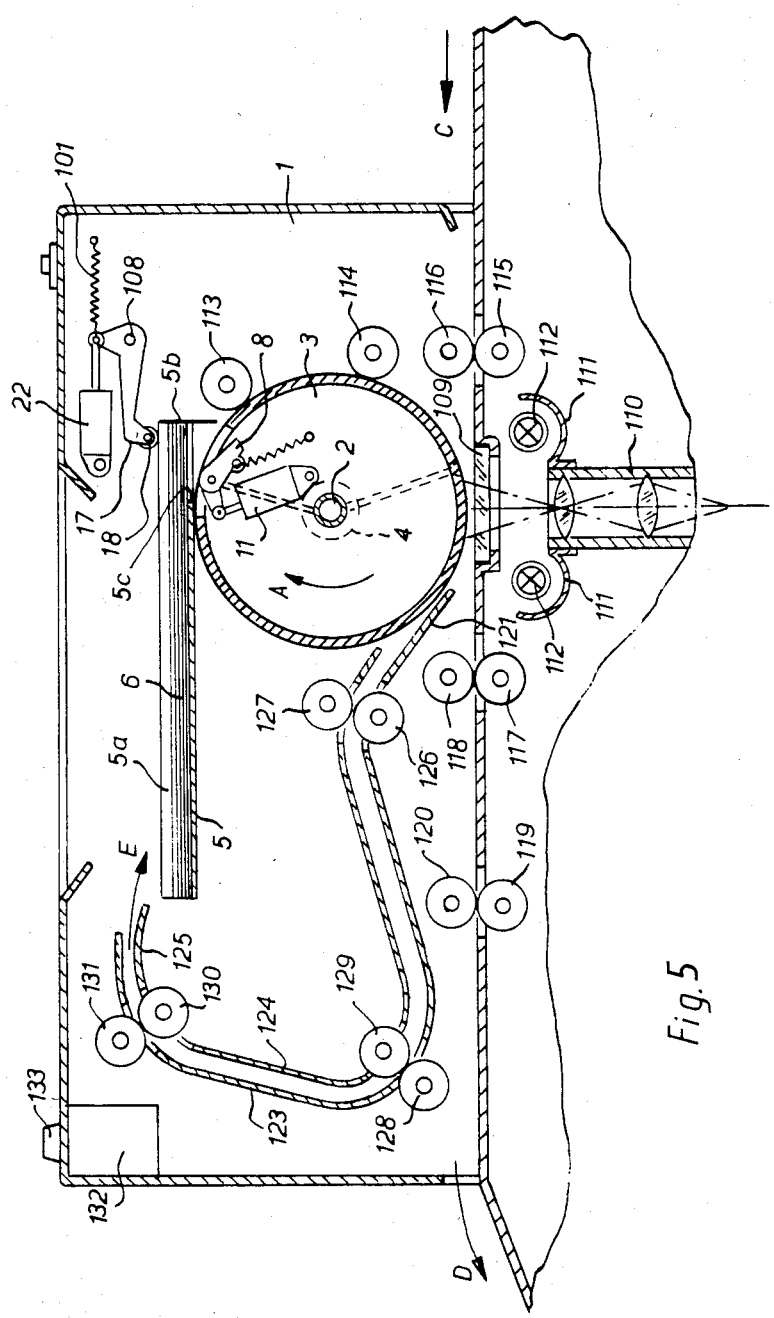
FIG. 5 is a view showing the inventive arrangement in accordance with another embodiment of the invention.
Figure 6:
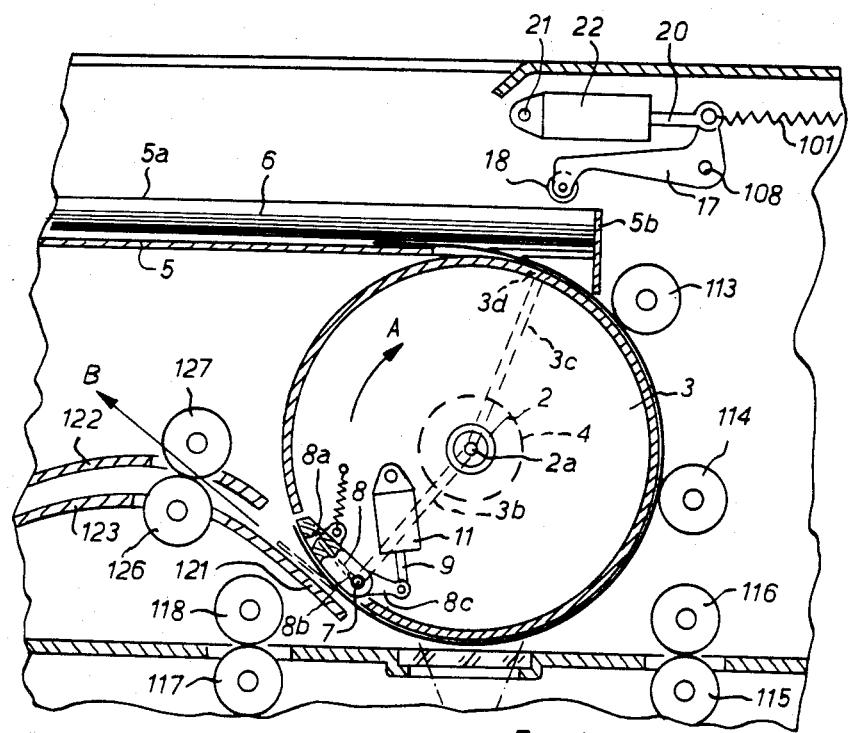
FIG. 6 is a view showing a section through a transport cylinder of the arrangement in accordance with the latter mentioned embodiment.

As can be seen from FIG. 5, a transparent plate 109 is arranged under the transport cylinder 3 so that the original pulled from the stack 6 can be transported over this plate during its illumination. The transparent plate 109 lies in an image field of a screen copying device 110 which is illuminated by two light pipes 112 arranged in a reflector 111. The screen copying device projects the image of the displacing original through the image window formed in the transparent plate 109 onto a not shown carrier which moves with a corresponding speed. For improving the imprint of the illuminated original, pressing rollers 113 and 114 abut against the periphery of the transport cylinder 3. Moreover, a further row of suction nozzles 3d is arranged on the periphery of the transport cylinder 3, as can be seen from FIG. 6. The further suction nozzles 3d engage the rear end of the original pulled from the stack 6 and fix the same on the transport cylinder 3. The suction nozzles 3d are connected by passages 3c with the central opening 2a of the shaft 2.

Driven transport roller pairs 115 and 116, 117 and 118, 119 and 120 are arranged at both sides of the transparent plate 109. They can transport by hand the copied original in direction of the arrow C. After its copying, the original is withdrawn in the direction of the arrow D from the apparatus.

Further, the transport cylinder 3 is connected with guide sheets 121–125 and driven transport roller pairs 126–131. They engage an original after its release from the transport cylinder 3 from its outer surface and transport the original back to the stack 6, wherein the original is placed on the stack in direction of the arrow E.

The operation of the later described arrangement corresponds to the operation of the arrangement shown in FIGS. 1–4 with the difference that the originals separated from the suction nozzle member or pulled from the stack are illuminated with the aid of the copying system 110 when it moves with the transport cylinder rotating in direction of the arrow E over the illuminating window 109 formed in the transparent plate 109. As soon as the transport cylinder assumes its position shown in FIG. 6, the suction air is turned off. The front end of the original engaged by the suction nozzle member 8 springs back from the transport cylinder 3 and abuts against the guiding sheet 121, so that during further rotation of the transport cylinder 3 in direction of the arrow B it runs between the guide sheets 122 and 123 and can be engaged by the transporting rollers 126 and 127. A multiple illumination of the originals fixed on the transport cylinder is possible, if needed, in which case the original is transferred to the transporting rollers 126 and 127 only after producing the required number of copies.

Figure 7:
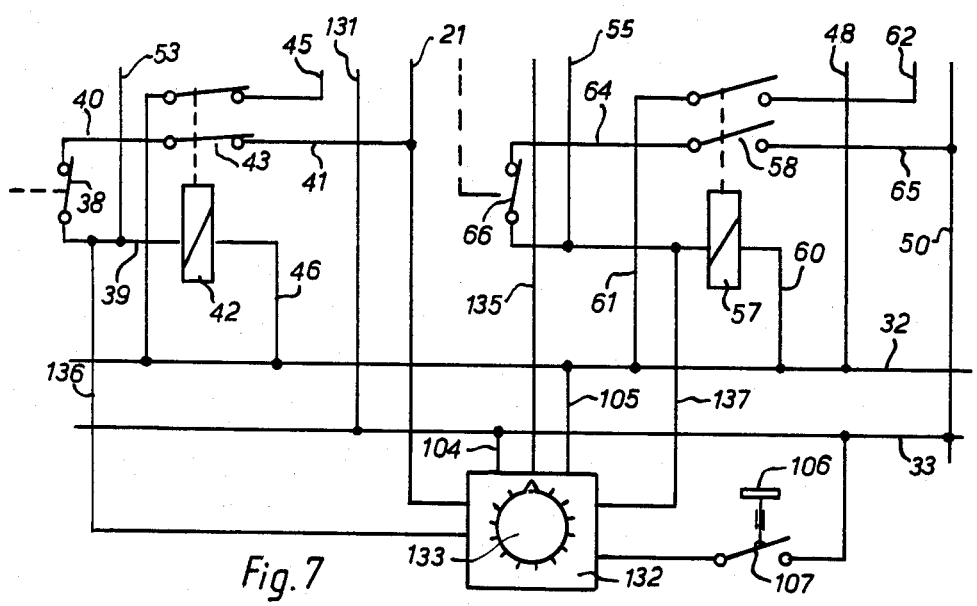
FIG. 7 is a view showing a portion of a circuit of the inventive arrangement.

The controlling of the above described separating, transporting and copying steps is performed with the control means shown in FIG. 4, with the difference that, as shown in FIG. 7, the control unit 103 is replaced by a control unit 132. A relay provided in the control unit 132 is so arranged, in correspondence with the relay contained in the control unit 103, that its holding circuit lies in the circuit of the motor 30. Thereby after each switching off of the motor 30 it deenergizes and must be again switched on by pressing of the start button 106 acting upon the start switch 107. Additional relays are provided for holding closed the holding circuit for the magnetic coupling 4 and the valve 23 for a certain number of revolutions, in dependence upon a desired number of copies.

For the case when several illuminations of the original arranged on the transport cylinder 3 are desired, the desired number of copies is adjusted on an adjusting button 133 of the control unit 132. It operates in such a manner that, being released from switching pulse of a switch 134 which is connected with the pusher 154 and lies in a conductor 135 leading to the control unit 132, the holding circuit of the relay 42 and 45 remain closed via connecting conductors 136 and 137 leading to the control unit 132. Thereby both closing of the valve 23 and releasing the magnetic coupling 4 are prevented for a time period lasting unit the switching mechanism of the adjusting button 133, which is contained in the control unit 132 and controlled by pulses of the switch 134 in dependence upon the number of already made copies, comes back to its initial position. The original located on the transport cylinder 3 rotates so long with the transport cylinder 3 until the desired number of copies is produced. Only then is it transferred in the above discussed manner to the transport rollers 126 and 127.

It will be understood that each of the elements described above, or two or more together, may also find a useful application in other types of constructions differing from the types described above.

While the invention has been illustrated and described as embodied in an arrangement for supplying originals in a copying apparatus, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. An arrangement for supplying originals for a copying apparatus, comprising
   a supply stack arranged above an illumination location of a copying apparatus and having a stack supporting surface, and a front stack abutment, said originals being placed in said stack so that their sides to be illuminated face upwardly;
   separating means arranged to remove an original from a lower side of said stack;
   guiding means forming a transport path for guiding the original from said stack supporting surface of said stack to the illumination location;
   transporting means arranged to turn the original removed from said stack and supply the original to the illumination location with its side to be illuminated downwardly, said transporting means including a rotatable transport cylinder connected with said transport path, said transport cylinder having a periphery and a through opening formed in said periphery, said stack supporting surface having near said transport cylinder an end section forming a tangent with the periphery of said transport cylinder and provided with an opening, said stack supporting surface contacting said transport cylinder in a contact point, said separating means being mounted on said transport cylinder in the region of said through opening and including a pivotable suction nozzle member, said opening of the stack supporting surface extending substantially from said contact point to said front stack abutment and allowing pivoting of said suction nozzle member to a free lower side of said stack in the region of said opening of the stack supporting surface;
   said suction nozzle member including a plurality of suction nozzles and being pivotable relative to said transport cylinder from a position inside said transport cylinder through said through opening of the transport cylinder to a position outside said transport cylinder towards the opening of the stack supporting surface to separate a lowermost original from the stack and back from the position outside the transport cylinder through said through opening in the periphery of the transport cylinder to the position inside thereof;
   a suction conduit with a valve operatively communicating suction conduit with said suction nozzles of said suction nozzle member; and
   control means arranged to switch off said transport cylinder in a position in which said suction nozzle member is to be pivoted towards said opening of said stack supporting surface, to pivot said suction nozzle member to the lower side of said stack after said transport cylinder has been switched off, to actuate said valve for communication said suction nozzles of said suction nozzle member with said suction conduit, to again switch on said transporting cylinder, and to pivot said suction nozzle member back inside said transport cylinder so that said transport cylinder is rotated together with said suction nozzle member to transport the lowermost original towards said illumination location.

2. An arrangement as defined in claim 1; and further comprising a plurality of pressing and transporting rollers associated with said transport path between said supply stack and the illuminating location.

3. An arrangement as defined in claim 2, wherein said control means includes control switching-off means for switching off said suction nozzle member for transferring the original from said transport cylinder to said pressing and transporting rollers.

4. An arrangement as defined in claim 1, wherein said supply stack has an upper part; and further comprising a holding-down member provided in said upper part of said stack and arranged for pressing the originals to said suction nozzle member in a position in which said suction nozzle member is at said supply stack.

5. An arrangement as defined in claim 1; and further comprising a plurality of further suction nozzles arranged on the periphery of said transport cylinder for fixing the original in its portion which is not engaged by said first-mentioned suction nozzles of said suction nozzle member.

6. An arrangement as defined in claim 5, wherein the originals are transported in a predetermined transporting direction, said additional suction nozzles being arranged so that they fix the original in its portion which is a rear portion as considered in the transporting direction.

7. An arrangement as defined in claim 1; and further comprising means forming a return transport path for returning the original after its illumination to an upper part of said stack, said return transport path forming means including a plurality of guiding members and a plurality of transporting rollers.

8. An arrangement as defined in claim 1, wherein said control means includes switching means arranged to prevent switching off a suction air for a selectable number of revolutions of said transport cylinder.

* * * * *